US009172308B2

(12) United States Patent
Shibasaki (10) Patent No.: US 9,172,308 B2
(45) Date of Patent: Oct. 27, 2015

(54) LOW-CAPACITY POWER SUPPLY AND IMAGE FORMING APPARATUS

(71) Applicant: Brother Kogyo Kabushiki Kaisha, Nagoya-shi, Aichi-ken (JP)

(72) Inventor: Akihiro Shibasaki, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/292,195

(22) Filed: May 30, 2014

(65) Prior Publication Data

US 2014/0355038 A1 Dec. 4, 2014

(30) Foreign Application Priority Data

May 31, 2013 (JP) ................................. 2013-115825

(51) Int. Cl.
*G06K 15/00* (2006.01)
*H02M 3/335* (2006.01)
*G03G 15/00* (2006.01)
*H02M 1/00* (2007.01)

(52) U.S. Cl.
CPC ........... *H02M 3/33523* (2013.01); *G03G 15/80* (2013.01); *H02M 2001/0006* (2013.01); *H02M 2001/009* (2013.01)

(58) Field of Classification Search
CPC ......... G03G 15/80; H02M 2001/0006; H02M 2001/009; H02M 3/33523
USPC .................................. 358/1.1–1.9, 1.11–1.18
See application file for complete search history.

(56) References Cited

U.S. PATENT DOCUMENTS

| 4,600,982 | A | 7/1986 | Graham |
| 4,910,654 | A | 3/1990 | Forge |
| 5,659,371 | A | 8/1997 | Krause |
| 7,602,158 | B1 | 10/2009 | Iacob |
| 2003/0005323 | A1 | 1/2003 | Hanley et al. |
| 2006/0076240 | A1 | 4/2006 | Neeb |

(Continued)

FOREIGN PATENT DOCUMENTS

| JP | H07308065 A | 11/1995 |
| JP | 2001177986 A | 6/2001 |

(Continued)

OTHER PUBLICATIONS

United States application entitled, "Low-capacity power supply, power supply system, and image forming apparatus," filed May 28, 2014.

(Continued)

*Primary Examiner* — King Poon
*Assistant Examiner* — Ibrahim Siddo
(74) *Attorney, Agent, or Firm* — Banner & Witcoff, Ltd.

(57) ABSTRACT

A low-capacity power supply is described in which an input capacitance may be adjusted. In one example, input capacitors may be located between an AC power supply and a rectifier. Additional adjustment capacitors may be located on one or more input lines to the rectifier. The adjustment capacitors may be added in series to at least one of the input capacitors to decrease the input capacitance of the rectifier. In this example, the power provided downstream of the rectifier may be adjusted to increased or reduced as needed. In other examples, additional switches are provided for the input capacitors to selectively add their capacitance to or remove their capacitance from the input of the rectifier.

14 Claims, 9 Drawing Sheets

(56) References Cited

U.S. PATENT DOCUMENTS

| | | |
|---|---|---|
| 2006/0126368 A1 | 6/2006 | Rapeanu |
| 2006/0209574 A1* | 9/2006 | Makino ................... 363/21.12 |
| 2008/0284537 A1* | 11/2008 | Ikenouchi ................ 333/17.3 |
| 2010/0238691 A1 | 9/2010 | Tsai |
| 2012/0038937 A1* | 2/2012 | Son ........................... 358/1.1 |
| 2012/0293017 A1 | 11/2012 | Lidsky et al. |
| 2013/0031396 A1 | 1/2013 | Inukai |

FOREIGN PATENT DOCUMENTS

| | | |
|---|---|---|
| JP | 2009148075 A | 7/2009 |
| JP | 2010093887 A | 4/2010 |
| JP | 2013031337 A | 2/2013 |

OTHER PUBLICATIONS

Oct. 8, 2014 (US) Election/Restriction Requirement—U.S. Appl. No. 14/289,003.

May 20, 2015—(US) Non-Final Office Action—U.S. Appl. No. 14/289,003.

* cited by examiner

LOW-CAPACITY POWER SUPPLY AND IMAGE FORMING APPARATUS

CROSS-REFERENCE TO RELATED APPLICATION

This application claims priority from Japanese Patent Application No. 2013-115825 filed on May 31, 2013, which is incorporated herein by reference in its entirety.

FIELD OF DISCLOSURE

The disclosure relates to a low-capacity power supply and an image forming apparatus comprising the low-capacity power supply. More specifically, the disclosure relates to a technique to stabilize an output of a capacitor insulated low-capacity power supply configured to insulate an AC power supply side and a DC output side with a capacitor.

BACKGROUND

A known capacitor insulated low-capacity power supply is configured to rectify and smooth an AC voltage applied to first and second capacitors, to use the rectified and smoothed voltage as power supply in a power saving mode of an image forming apparatus.

In the low-capacity power supply, the AC current flowing to the first capacitor and the second capacitors is originally minute. When the AC current fluctuates as the AC voltage does, the influence of the fluctuations of the AC current may influence over an operation of a smoothing circuit of the low-capacity power supply, so that a stable DC output might not be obtained.

SUMMARY

The disclosure relates to a technique to reduce influences on an output of a low-capacity power supply due to fluctuations of an AC voltage.

A low-capacity power supply is described in which an input capacitance may be adjusted. In one example, input capacitors may be located between an AC power supply and a rectifier. Additional adjustment capacitors may be located on one or more input lines to the rectifier. The adjustment capacitors may be added in series to at least one of the input capacitors to decrease the input capacitance of the rectifier. In this example, the power provided downstream of the rectifier may be adjusted to increased or reduced as needed. In other examples, additional switches are provided for the input capacitors to selectively add their capacitance to or remove their capacitance from the input of the rectifier.

BRIEF DESCRIPTION OF THE DRAWINGS

Reference now is made to the following description taken in connection with the accompanying drawings.

DETAILED DESCRIPTION

An illustrative embodiment will be described referring to FIGS. 1-5.

1. Description of Printer

Figure 1:
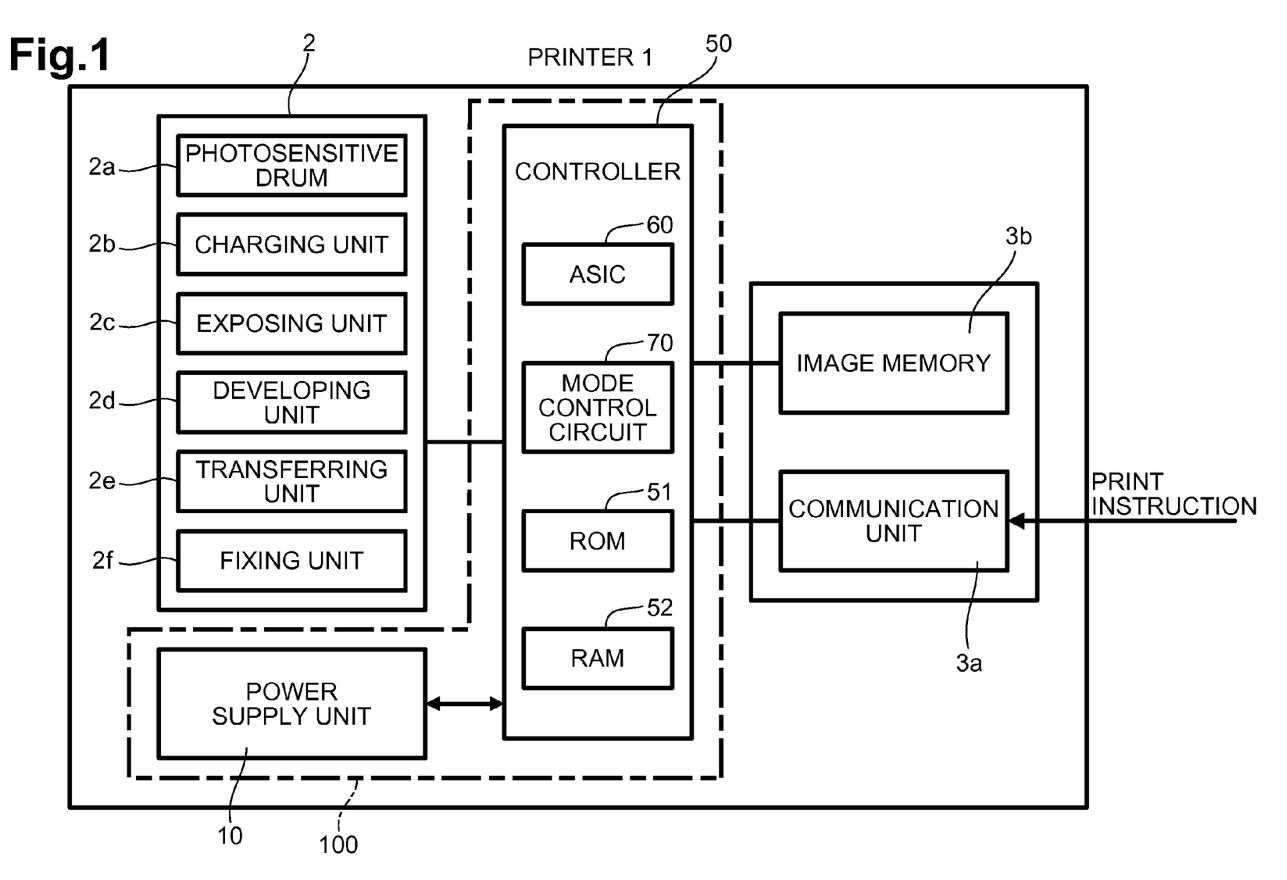
FIG. 1 is a block diagram illustrating configuration of an image forming apparatus according to an illustrative embodiment.

FIG. 1 is a block diagram illustrating an electrical configuration of an image forming apparatus, e.g., a printer 1. The printer 1 may comprise a printing unit 2, a communication unit 3a, an image memory 3b, and a power supply system 100. The power supply system 100 may comprise a power supply unit 10 and a controller 50. The power supply unit 10 may function as a power supply of the printer 1. The power supply unit 10 may be configured to supply power to the printing unit 2, the communication unit 3a, the image memory 3b and the controller 50.

The printing unit 2 may comprise a photosensitive drum 2a, a charging unit 2b configured to perform a charging process of charging a surface of the photosensitive drum 2a, an exposing unit 2c configured to perform an exposing process of forming an electrostatic latent image on the surface of the photosensitive drum 2a, a developing unit 2d configured to perform a developing process of attaching a developer onto the electrostatic latent image formed on the surface of the photosensitive drum 2a so as to form a developer image, a transferring unit 2e configured to perform a transferring process of transferring the developer image onto a recording medium, and a fixing unit 2f configured to perform a fixing process of fixing the developer image transferred on the recording medium.

The printing unit 2 may be configured to perform the charging process, the exposing process, the developing process, the transferring process, and the fixing process, thereby performing a printing process of printing print data onto a recording medium. The communication unit 3a may be configured to perform communication with an information terminal device, e.g., a personal computer (PC), and may have a function of receiving print instructions and print data from the information terminal device. The image memory 3b may be configured to temporarily store print data received from the information terminal device.

The controller 50 may comprise an application specific integrated circuit (ASIC) 60, a mode control circuit 70, a read-only memory (ROM) 51, and a random-access memory (RAM) 52. The printing unit 2, the communication unit 3a and the image memory 3b may be connected to the controller 50.

The ASIC 60 may be configured to receive DC 5 V and DC 3.3 V from a switching power supply 20 as a power source. The ASIC 60 may be configured to mainly control the printing unit 2 of the printer 1. The ASIC 60 may be configured to control the printing unit 2 based on programs stored in the ROM 51. The ASIC 60 may be configured to store control results in the RAM 52.

If the communication unit 3a receives a print instruction and receives print data from the information terminal device, the controller 50 may control the printing unit 2 to perform the printing process comprising the charging process, the exposing process, the developing process, the transferring process, and the fixing process, so that the printer 1 may print the print data onto a recording medium. The operating voltage of the printing unit 2 may be mainly 24 V. The operating voltage of the communication unit 3a, the image memory 3b and the controller 50 may be mainly 3.3 V.

The printer 1 may have a normal mode and a power saving mode as operation modes. In the normal mode, the printer 1 may perform the printing process immediately in response to a print instruction. Therefore, in the normal mode, the power supply system 100 and the controller 50 may be operating, and energization of the fixing unit 2f may be controlled so that the fixing unit 2f may be maintained at a temperature at which fixing is possible or a temperature slightly lower than the temperature at which fixing is possible. In the power saving mode, the printer 1 may be placed in a standby state without receiving any print instruction for a predetermined period of time. In the power saving mode, a portion of the power supply system 100 and the controller 50 may be operating, and the fixing unit 2f may be in non-energization.

2. Configuration of Power Supply System

The configuration of the power supply system 100 will be described referring to FIG. 2. The power supply unit 10 of the power supply system 100 may comprise the switching power supply 20 and a low-capacity power supply 30.

2-1. Switching Power Supply

The switching power supply 20 may comprise a rectifying/smoothing circuit 21, a control IC 22, a voltage generating circuit 23, a transformer 24, a field effect transistor (FET) Q1, a rectifying/smoothing circuit 25, a voltage detecting circuit 26, and DC-DC converters 27 and 28.

The switching power supply 20 may be configured to rectify and smooth an AC voltage Vac of an AC power supply AC, to generate DC voltages of +24 V, +5 V and +3.3 V in the normal mode. The DC voltage of +24 V (hereinafter, referred to as DC 24 V) may be output from a first output terminal OUT1. The DC voltage of +5 V (hereinafter, referred to as DC 5 V) may be output from a second output terminal OUT2. The DC voltage of +3.3 V (hereinafter, referred to as DC 3.3 V) may be output from a third output terminal OUT3.

The rectifying/smoothing circuit 21 may be a so-called capacitor input type, and may comprise a bridge diode configured to rectify the AC voltage Vac of the AC power supply AC, and a capacitor configured to smooth the rectified voltage. An output of the rectifying/smoothing circuit 21 may be applied to a primary coil of the transformer 24.

The transistor Q1 may be an N-channel MOSFET. The transistor Q1 may be configured to be turned on or off in response to an on/off signal (PWM signal) given to a gate of the transistor Q1 from an output port OUT of the control IC 22. Accordingly, the primary side of the transformer 24 may oscillate so that a voltage may be induced at a secondary coil of the transformer 24.

The voltage generating circuit 23 may be provided on the primary side of the transformer 24. The voltage generating circuit 23 may be configured to generate a power supply voltage Vcc for the control IC 22 by rectifying and smoothing a voltage induced at an auxiliary coil provided on the primary side of the transformer 24.

The rectifying/smoothing circuit 25 may be configured to rectify and smooth a voltage induced at the secondary coil of the transformer 24, to generate DC 24 V.

The voltage detecting circuit 26 may comprise a photocoupler PC1 comprising a light emitting diode LED1. The voltage detecting circuit 26 may be configured to make the light emitting diode LED1 of the photocoupler PC1 emit light in response to the detected level of the DC 24 V output by the switching power supply 20. The photocoupler PC1 may comprise a phototransistor PT1 connected to a feedback port FB of the control IC 22. Therefore, a light signal of the light emitting diode LED1 may be converted into an electric signal by the phototransistor PT1, and the detected value of the output of DC 24 V may be fed back to the feedback port FB of the control IC 22.

The DC-DC converter 27 may be configured to convert DC 24 V into DC 5 V and to output DC 5 V. The DC-DC converter 28 may be configured to convert DC 24 V into DC 3.3 V and to output DC 3.3 V.

The control IC 22 may be configured to control the on/off signal for the transistor Q1 in response to a control pulse signal Scp input to a control input port EN from the controller 50, to control oscillation of the primary side of the transformer 24. In the normal mode, the primary side of the transformer 24 may oscillate to generate respective DC voltages. In the power saving mode, oscillation of the primary side of the transformer 24 may be stopped by stopping output of the on/off signal to the transistor Q1. In other words, in the power saving mode, any DC voltages might not be output from the switching power supply 20. When the printer 1 returns from the power saving mode to the normal mode, the control pulse signal Scp may be input from the controller 50 to the control input port EN, and oscillation of the primary side of the transformer 24 may start in response to the control pulse signal Scp. Thus, the respective DC voltages may be output from the switching power supply 20. In other words, the switching power supply 20 may be placed in an output mode when the printer 1 is in the normal mode. The switching power supply 20 may be placed in an output stop mode and stop its operation when the printer 1 is in the power saving mode.

2-2. Low-Capacity Power Supply

The low-capacity power supply 30 may have a power supply capacity smaller than that of the switching power supply 20. The low-capacity power supply 30 may comprise a first capacitor C1 configured to connect to one end of the AC power supply AC, and a second capacitor C2 configured to connect to the other end of the AC power supply AC. The low-capacity power supply 30 may be a capacitor insulated low-capacity power supply configured to insulate an AC power supply side and a DC output side with the capacitors C1 and C2.

The low-capacity power supply 30 may further comprise adjustment capacitors C3 and C4, switching circuits, e.g., a first switch SW1 and a second switch SW2, a rectifier 31, a smoothing circuit 32, an oscillation controller 53, and a controller, e.g., a switch control circuit 54 and a mode control circuit 70. The low-capacity power supply 30 may be configured to supply power to the mode control circuit 70 in the power saving mode and the normal mode. In other words, the low-capacity power supply 30 may supply power to the mode control circuit 70 while the switching power supply 20 is stopped as well.

The adjustment capacitor C3 may be configured to electrically connect to the first capacitor C1 in series. The first capacitor C1 and the adjustment capacitor C3 configured to connect to a first AC line Lac1 may be hereinafter referred to as the first input capacitor (e.g., a first capacitor group). The second capacitor C2 and the adjustment capacitor C4 configured to connect to a second AC line Lac2 may be hereinafter referred to as the second input capacitor (e.g., a second capacitor group). The switching of the first switch SW1 adjusts the capacitance of the first capacitor group by electrically shorting the terminals of capacitor C3. The adjustment capacitor C4 may be configured to electrically connect to the second capacitor C2 in series. The switching of the second switch SW2 adjusts the capacitance of the second capacitor group by electrically shorting the terminals of capacitor C4.

The first switch SW1 may be configured to connect to the adjustment capacitor C3 in parallel. The first switch SW1 may be configured to allow the AC current from the AC power supply AC to flow therethrough and prevent the AC current from the AC power supply AC from flowing therethrough. When the first switch SW1 is switched to allow the AC current to flow therethrough, the capacitance of the first input capacitor may be "C1." When the first switch SW1 is switched to prevent the AC current from flowing therethrough, the capacitance of the first input capacitor may be "C1*C3/(C1+C3)". The reference characters "C1" may denote the first capacitor and the capacitance of the first capacitor. The same applies to other capacitors.

The second switch SW2 may be configured to connect to the adjustment capacitor C4 in parallel. The second switch SW2 may be configured to allow the AC current from the AC power supply AC to flow therethrough and prevent the AC current from the AC power supply AC from flowing therethrough. When the second switch SW2 is switched to allow the AC current to flow therethrough, the capacitance of the second input capacitor may be "C2." When the second switch SW2 is switched to prevent the AC current from flowing therethrough, the capacitance of the second input capacitor may be "C2*C4/(C2+C4)."

In a known low-capacity power supply that does not comprise the adjustment capacitors C3 and C4, the capacitance of the first capacitor C1 and the second capacitor C2 may be, for example, 1500 pF (picofarads). In the illustrative embodiment, the capacitance of each capacitor C1, C2, C3 and C4 may be, for example, C1=C2=C3=C4=3300 pF. When each switch SW1 and SW2 is turned off, and the resultant capacitance of the capacitors C1 and C3 or C2 and C4 that are connected in series may be 1650 pF. In other words, the capacitance of each capacitor C1, C2, C3 and C4 may be selected to become approximately equal to the capacitance of the capacitors C1 and C2 of the known low-capacity power supply. When each switch SW1 and SW2 is turned on, the resultant capacitance of the first capacitor group and second capacitor group may increase to 3300 pF. Accordingly, the input current capacitance of the low-capacity power supply 30 may increase. The selection of the capacitance of each capacitor C1, C2, C3 and C4 might not be limited to the above-described manner. For example, the capacitance of each capacitor C1, C2, C3 and C4 may be selected according to a range in which the smoothed voltage VDD is maintained with respect to fluctuations of the AC voltage Vac.

Figure 3:
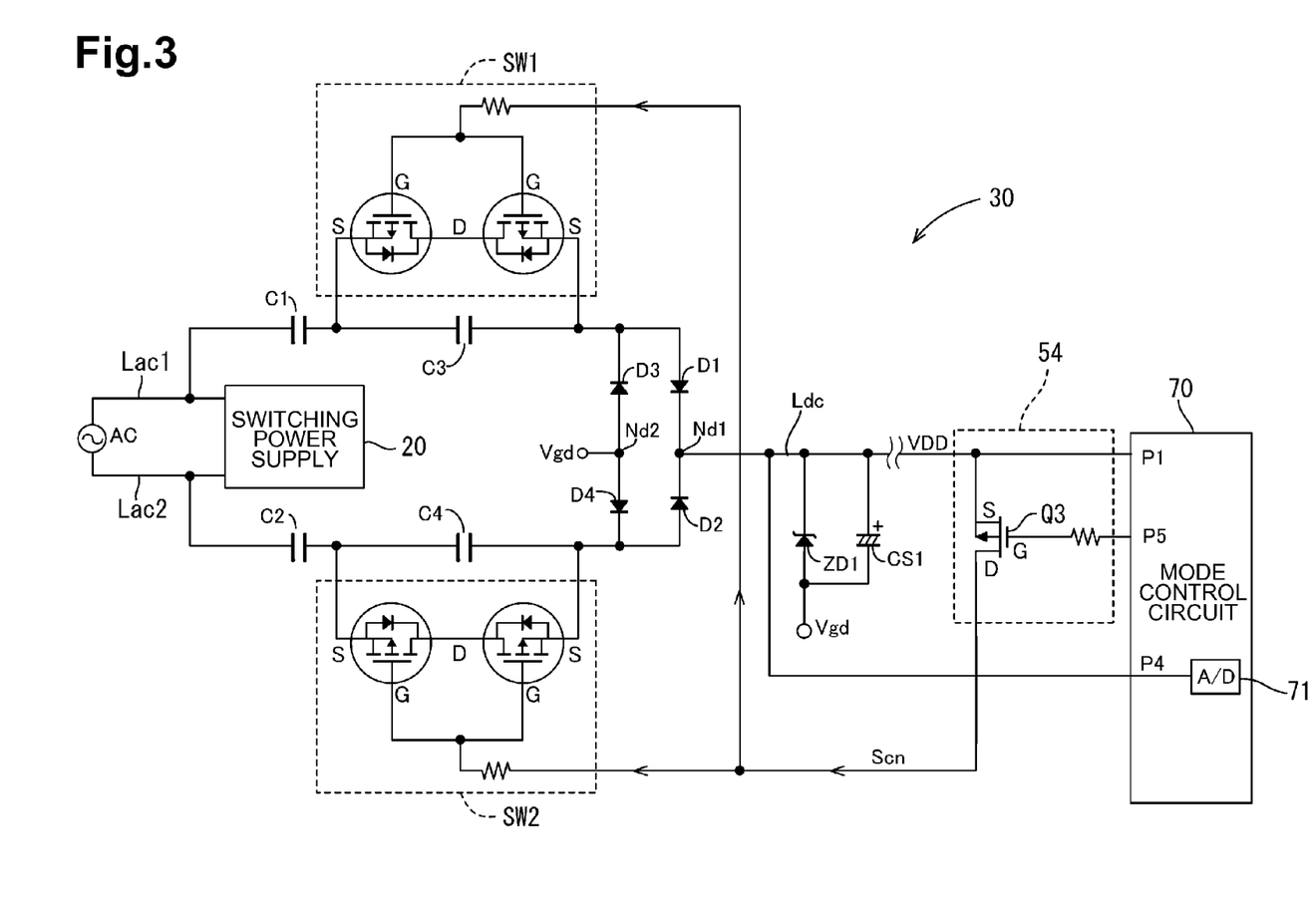
FIG. 3 is a circuit diagram illustrating configuration of a low-capacity power supply according to an illustrative embodiment.

In the illustrative embodiment, each first and second switch SW1 and SW2 may comprise two field effect transistors, e.g., two N-channel MOSFETs, that may be connected in series, as depicted in FIG. 3.

The rectifier 31 may be provided at a stage following the first and second capacitors C1 and C2 with respect to the AC power supply AC. The rectifier 31 may be configured to rectify the AC voltage Vac. In the illustrative embodiment, the rectifier 31 may comprise a bridge circuit comprising four diodes D1, D2, D3, and D4. Cathodes of the diodes D1 and D2 may be connected at a first node Nd1. An anode of the diode D1 may be connected to the adjustment capacitor C3. An anode of the diode D2 may be connected to the adjustment capacitor C4.

Anodes of the diodes D3 and D4 may be connected at a second node Nd2. A cathode of the diode D3 may be connected to the adjustment capacitor C3. A cathode of the diode D4 may be connected to the adjustment capacitor C4. The second node Nd2 may be set to, for example, a reference potential Vgd (0 V).

The smoothing circuit 32 may be configured to connect to the rectifier 31. The smoothing circuit 32 may be configured to smooth the rectified AC voltage to generate a smoothed voltage VDD. The smoothing circuit 32 may comprise a smoothing storage capacitor CS1 and a Zener diode ZD1. The Zener diode ZD1 may be configured to suppress the smoothed voltage VDD from rising when the AC voltage Vac of the AC power supply AC rises. In the illustrative embodiment, the Zener voltage of the Zener diode ZD1 may be, for example, 5 V. The smoothed voltage VDD may be approximately 5 V. The smoothed voltage VDD may correspond to an output voltage of the low-capacity power supply 30. The smoothed voltage VDD may be supplied to a port P1 of the mode control circuit 70.

The charged power of the smoothing storage capacitor CS1 may be used for a drive current for a light emitting diode LED2 of a photocoupler PC2 of the oscillation controller 53 when the mode is switched from the power saving mode to the normal mode. The capacitance of the smoothing storage capacitor CS1 may be appropriately selected, so that it may be possible to accumulate an amount of power according to the needs for a predetermined voltage in the power saving mode. In the first illustrative embodiment, it may be possible to accumulate an amount of power to reliably drive the light emitting diode LED2 of the photocoupler PC2. Therefore, the switching power supply 20 may be reliably restarted As depicted in FIG. 3, the switch control circuit 54 may comprise, for example, a field effect transistor Q3, e.g., a P-channel MOSFET, configured to connect to a smoothing power supply line Ldc. The field effect transistor Q3 may be turned on in response to a gate signal from a port P5 of the mode control circuit 70. As the field effect transistor Q3 supplies a control signal Scn of DC 5 V to each gate of the N-channel MOSFETs of the first and second switches SW1 and SW2, each N-channel MOSFET may be turned on. Accordingly, the first and second switches SW1 and SW2 may be switched to allow the AC current to flow therethrough from the AC power supply AC.

The mode control circuit 70 may comprise an analog/digital (A/D) converter 71. The A/D converter 71 may be connected to a port P4 of the mode control circuit 70 that may be connected to the smoothing power supply line Ldc. The smoothed voltage VDD may be input to the port P4. The A/D converter 71 may be configured to detect the smoothed voltage VDD (an example of a detected value) and convert an analog smoothed voltage VDD to a digital smoothed voltage VDD. The mode control circuit 70 may be configured to detect the converted digital smoothed voltage VDD. The mode control circuit 70 and the A/D converter 71 may be an example of a detecting circuit. The mode control circuit 70 may be constituted by, for example, an ASIC comprising a CPU or by a CPU and the A/D converter 71.

The smoothed voltage VDD may be an example of an electricity-related amount corresponding to the voltage of the AC power supply AC. More specifically, according to the range of the reverse current used in the Zener diode ZD1, the Zener voltage might not be constant. Especially when power supply capacity is small like in in the illustrative embodiment, and the Zener diode ZD1 is used in a range in which Zener reverse current is small, the Zener voltage (e.g., the smoothed voltage VDD) may change according to the Zener reverse current, e.g., according to the AC voltage Vac, due to characteristics of the Zener diode ZD1. For example, as the AC voltage Vac is reduced, the rectified current may be reduced, so that the Zener voltage may be reduced. Therefore, changes in the AC voltage Vac may be detected by detecting the smoothed voltage VDD that may be substantially the same as the Zener voltage.

The mode control circuit 70 may be configured to output a signal for controlling the switch control circuit 54 from the port P5 according to the detected smoothed voltage VDD. In other words, the mode control circuit 70 may be configured to control the first and second switches SW1 and SW2, via the switch control circuit 54, to switch the current path of the AC current.

The oscillation controller 53 may comprise the photocoupler PC2 comprising the light emitting diode LED2. The oscillation controller 53 may be configured to control the oscillation of the switching power supply 20.

The mode control circuit 70 may be configured to switch the switching power supply 20 between the output mode and the output stop mode in which oscillation of the switching power supply 20 may be stopped, for example, in response to a signal input to a port P2 of the mode control circuit 70 by a user's operation of switching the mode of the printer 1 with a switch S1. More specifically, the mode control circuit 70 may be connected to a base of a transistor Q2 of the oscillation controller 53. As the mode control circuit 70 supplies a control pulse signal Scp to the base of the transistor Q2 from a port P3, the light emitting diode LED2 of the photocoupler PC2 of the oscillation controller 53 may emit light. Accordingly, the phototransistor PT2 of the photocoupler PC2 connected to the control input port EN of the control IC 22 of the switching power supply 20 may be controlled. In other words, the mode control circuit 70 may be configured to perform a process (e.g., a mode switching processing) to switch the mode of the switching power supply 20 between the output mode (e.g., the normal mode) and the output stop mode (e.g., the power saving mode), with the control pulse signal Scp.

In another embodiment, the mode of the switching power supply 20 may be switched from the output mode to the output stop mode without a user's operation of the switch S1. For example, the mode may be switched from the output mode to the output stop mode when such a situation is continued that the printer 1 does not receive any print data for a predetermined time and is not operated for the predetermined time.

Figure 2:
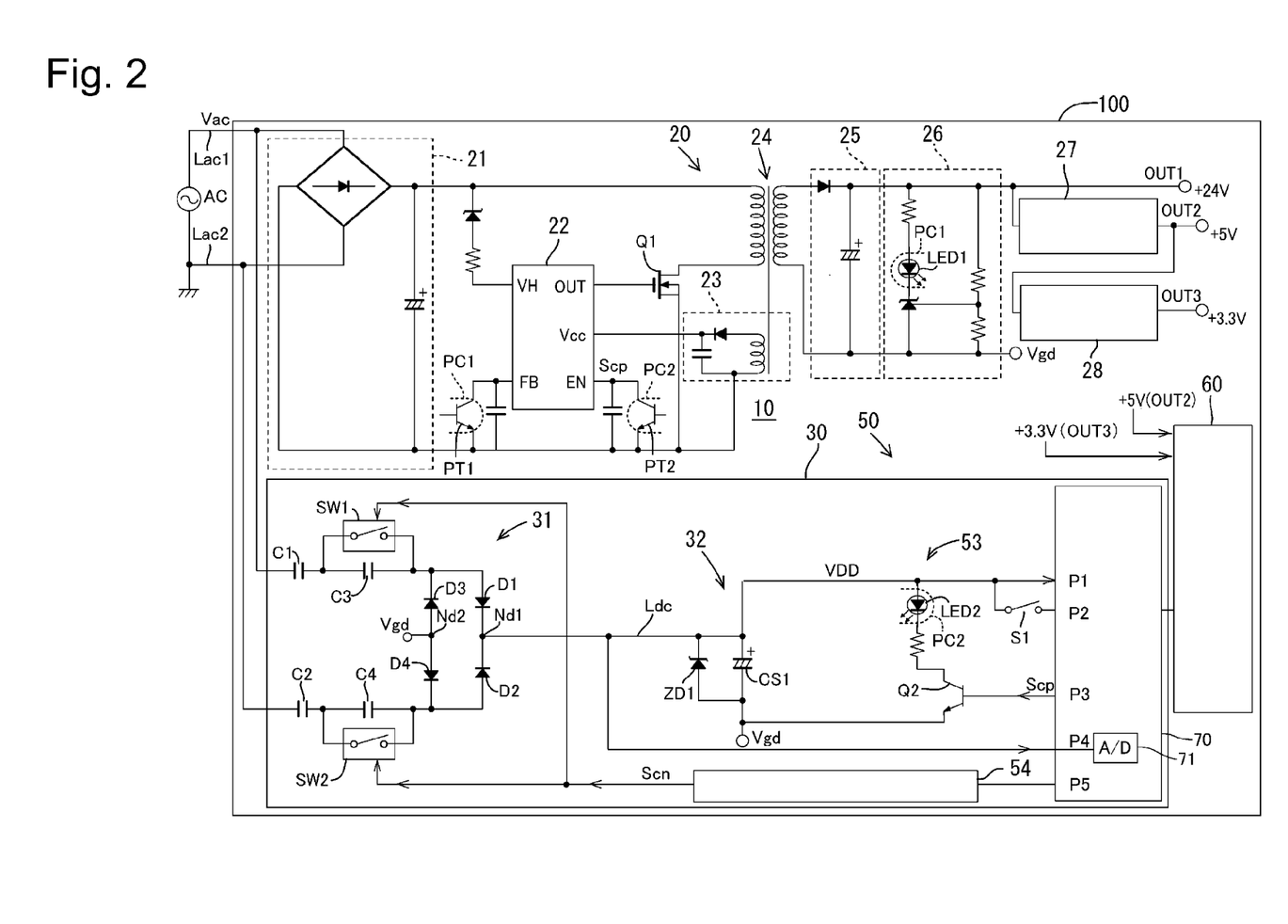
FIG. 2 is a block diagram illustrating configuration of a power supply system according to an illustrative embodiment.

The structure of the low-capacity power supply 30 might not be limited to that depicted in FIG. 2. For example, the rectifier 31 may be a half-wave rectifier. The second node Nd2 may be grounded. In other words, the printer 1 may be connected to a frame ground (FG). Further, the low-capacity power supply 30 may comprise a linear regulator configured to regulate the smoothed voltage VDD to a predetermined voltage. The low-capacity power supply 30 may comprise a storage capacitor. The oscillation controller 53 may be omitted.

3. Current Path Switching Processing

Next, a switching processing, e.g., a current path switching processing, will be described referring to FIGS. 4 and 5. The current path switching processing may be mainly executed by the mode control circuit 70, for example, when a power cord of the printer 1 is plugged in a socket and the AC power supply AC may be applied to the printer 1. In other words, the current path switching processing may be started when the printer 1 is turned on and may end when the printer 1 is turned off.

In the current path switching processing, the mode control circuit 70 may control the first and second switches SW1 and SW2 via the switch control circuit 54 to switch a path of the AC current, according to the detected smoothed voltage VDD. In the current path switching processing, the smoothed voltage VDD may be detected every predetermined time by the A/D converter 71 and the mode control circuit 70.

When the AC power supply AC is applied to the printer 1, the mode control circuit 70 may first turn the first and second switches SW1 and SW2 on via the switch control circuit 54 (step S110). In other words, the first and second switches SW1 and SW2 may be switched to allow the AC current to flow therethrough. In this case, the current may flow through the first capacitor C1 and the second capacitor C2 among the first input capacitor and the second input capacitor, respectively. In this case, the capacitance of the first input capacitor and the second input capacitor may increase from 1650 pF to 3300 pF.

Then, the mode control circuit 70 may determine whether the smoothed voltage VDD is greater than or equal to a first threshold voltage Vth1 (step S120). The first threshold voltage Vth1 may be, for example, 4.8 V (refer to FIG. 5). When the mode control circuit 70 determines that the smoothed voltage VDD is not greater than or equal to the first threshold voltage Vth1 (step S120: NO), the state of the first and second switches SW1 and SW2 that are turned on may continue. When the mode control circuit 70 determines that the smoothed voltage VDD is greater than or equal to the first threshold voltage Vth1 (step S120: YES), the first and second switches SW1 and SW2 may be switched from "on" to "off" (step S130). In other words, the first and second switches SW1 and SW2 may be switched from a state in which the AC current may flow therethrough to a state in which the AC current may be interrupted. Thus, the first capacitor C1 and the adjustment capacitor C3 of the first input capacitor may be connected in series. The second capacitor C2 and the adjustment capacitor C4 of the second input capacitor group may be connected in series. In this case, the capacitance of the first input capacitor and the second input capacitor may reduce from 3300 pF to 1650 pF.

Thus, at the startup of the low-capacity power supply 30, the first and second switches SW1 and SW2 may be turned on to allow the AC current to flow therethrough in the illustrative embodiment. In other words, the capacitance of the first and second input capacitors may increase, so that the AC current flowing through the first and second input capacitors may increase. Accordingly, the rectified current, e.g., a charging current of the smoothing storage capacitor CS1, may increase. A charging time of the smoothing storage capacitor CS1 may be reduced and the startup time of the low-capacity power supply 30 may be reduced. Thus, a predetermined power to be supplied by the low-capacity power supply 30 may be ensured promptly.

To execute processes for starting up the low-capacity power supply 30 in steps S110-S130, it may be preferable to use, for example, an electric double-layer capacitor that may have longer electric charge storage time, for the smoothing storage capacitor CS1. Instead of two N-channel MOSFETs, two latching relays having a contact that may be turned on when the latching relays are not energized may be used for the first and second switches SW1 and SW2. With the use of the electric double-layer capacitor or latching relays, the current may flow through the first capacitor C1 and the second capacitor C2 among the first input capacitor and the second input capacitor, respectively, when the printer 1 is turned on.

Then, the mode control circuit 70 may determine whether the smoothed voltage VDD is less than a second threshold voltage Vth2 (step S140). The second threshold voltage Vth2 (e.g., a lower limit) may be, for example, 3.2 V (refer to FIG. 5). When the mode control circuit 70 determines that the smoothed voltage VDD is not less than the second threshold voltage Vth (step S140: NO), the state of the first and second switches SW1 and SW2 that may be turned off may continue.

When the AC voltage Vac starts to reduce (refer to a time t0 in FIG. 5) and the smoothed voltage VDD is reduced to less than the second threshold voltage Vth2 during the operation of the low-capacity power supply 30, the mode control circuit 70 may determine that the smoothed voltage VDD is less than the second threshold voltage Vth2 (step S140: YES) and turn the first and second switches SW1 and SW2 on (step S150). The time at which the first and second switches SW1 and SW2 are tuned on may correspond to a time t1 in FIG. 5. As the first and second switches SW1 and SW2 are turned on, the capacitance of the first input capacitor and the second input capacitor may increase from 1650 pF to 3300 pF. Therefore, the rectified current may increase and the Zener reverse current may increase. Accordingly, the Zener voltage, e.g., the smoothed voltage VDD, may increase.

Thus, when the smoothed voltage VDD is less than the second threshold voltage Vth2, the mode control circuit 70 may switch a current path by switching the first and second switches SW1 and SW2 to allow the AC current to flow therethrough. Therefore, even when the AC voltage Vac is reduced from a predetermined voltage and the smoothed voltage VDD is reduced to less than the second threshold voltage Vth2, the smoothed voltage VDD may be increased to ensure power to be supplied by the low-capacity power supply 30.

The current path may be switched not only by switching each of the first and second switches SW1 and SW2 to allow the AC current to flow therethrough but also by switching at least one of the first and second switches SW1 and SW2 to allow the AC current to flow therethrough. In other words, the capacitance of at least one of the first input capacitor and the second input capacitor may be increased from 1650 pF to 3300 pF, so that the AC current (e.g., AC current of a half-cycle) flowing at least one of the first AC line Lac1 and the second AC line Lac2 may be increased. Accordingly, the smoothed voltage VDD may increase.

Then, the mode control circuit 70 may determine whether the smoothed voltage VDD is greater than or equal to the first threshold voltage Vth1 (step S160). When the mode control circuit 70 determines that the smoothed voltage VDD is not greater than or equal to the first threshold voltage Vth1 (step S160: NO), the state of the first and second switches SW1 and SW2 that may be turned on may continue.

When the smoothed voltage VDD increases to the first threshold voltage Vth1 with the first and second switches SW1 and SW2 turned on, the mode control circuit 70 may determine that the smoothed voltage VDD is greater than or equal to the first threshold voltage Vth1 (step S160: YES), and turn the first and second switches SW1 and SW2 off (step S170). The time at which the first and second switches SW1 and SW2 are turned off may correspond to a time t2 in FIG. 5. As the first and second switches SW1 and SW2 are turned off, the capacitance of the first input capacitor and the second input capacitor may reduce from 3300 pF to 1650 pF. Therefore, the rectified current may be reduced, so that Zener reverse current may be reduced. Accordingly, the Zener voltage, e.g., the smoothed voltage VDD, may be reduced.

Then, the mode control circuit 70 may return to step S140, and repeat steps S140-S170 in which the first and second switches SW1 and SW2 may be repeatedly turned on (refer to times t3 and t5) and off (refer to times t4 and t6) according to the changes in the smoothed voltage VDD. Accordingly, even when the AC voltage Vac is reduced during the operation of the low-capacity power supply 30, the smoothed voltage VDD may be maintained between the second threshold voltage Vth2 (e.g., 3.2 V) and the first threshold voltage Vth1 (e.g., 4.8 V), as depicted in FIG. 5.

The first threshold voltage Vth1 in step S120 at the time of power-on, and the first threshold voltage Vth1 in step S160 may be, for example, 4.8 V. However, the disclosure might not be limited thereto. For example, the first threshold voltage Vth1 in step S120 may be set to, for example, 5.2 V.

The first and second switches SW1 and SW2 may be turned off in steps S130 and S170 and turned on in step S150, via one switch control circuit 54. However, the disclosure might not be limited thereto. The switch control circuit 54 may be provided for each of the switches SW1 and SW2, and each switch control circuit 54 may be configured to turn the respective switch SW1 and SW2 on and off.

In another embodiment, either one of the adjustment capacitors C3 and C4 may be omitted. In association with the omission of the either adjustment capacitor C3 or C4, the first switch SW1 or the second switch SW2 may be omitted.

Steps S110-S130, which may be performed at the startup of the low-capacity power supply 30, might not be necessarily required and may be omitted.

In another embodiment, either one of the switches SW1 or SW2 may be switched, e.g., may be turned on or off, during the current path switching processing, unlike the above embodiment in which both switches SW1 and SW2 may be switched.

4. Effects of Illustrative Embodiment

Even when the AC voltage Vac fluctuates, the AC current may be adjusted by appropriately setting the capacitance of the first and second capacitors C1 and C2 and the adjustment capacitors C3 and C4, and by switching, with the first and second switches SW1 and SW2, the connection of the first and second capacitors C1 and C2 and the adjustment capacitors C3 and C4 to the AC power supply AC. The first and second switches SW1 and SW2 may be turned on to increase the capacitance of the first and second input capacitors when the AC voltage Vac is reduced from the predetermined voltage. Thus, the reduction of current capacity of the low-capacity power supply 30 due to the reduction of the AC voltage Vac may be reduced or prevented and influences on an output of the low-capacity power supply 30 due to fluctuations of the AC voltage Vac may be reduced. Accordingly, even when the AC voltage Vac is reduced, the reduction of the smoothed voltage VDD, e.g., output of the low-capacity power supply 30, may be controlled and operational stop of the electronic components configured to operate with the smoothed voltage VDD may be reduced or prevented.

The mode control circuit 70 may be configured to detect the fluctuation of the smoothed voltage VDD. When the smoothed voltage VDD is out of a predetermined range, the mode control circuit 70 may switch the switches SW1 and SW2 such that the smoothed voltage VDD may fall within the predetermined range. Consequently, influence on the mode switching processing may be reduced.

<Other Illustrative Embodiments

This disclosure might not be limited to the specific embodiments described referring to the drawings, but, for example, the following illustrative embodiments may be included in the technical scope of this disclosure.

(1) In the above-described embodiment, the switching circuit, e.g., the first and the second switches SW1 and SW2, may be constructed from two N-channel MOSFETs. The switch control circuit 54 may be constructed from a P-channel MOSFET. However, the disclosure might not be limited thereto. For example, the first and second switches SW1 and SW2 may be constructed from latching relays. The switch control circuit 54 may be constructed from a relay control circuit configured to turn the latching relays on and off.

Figure 4:
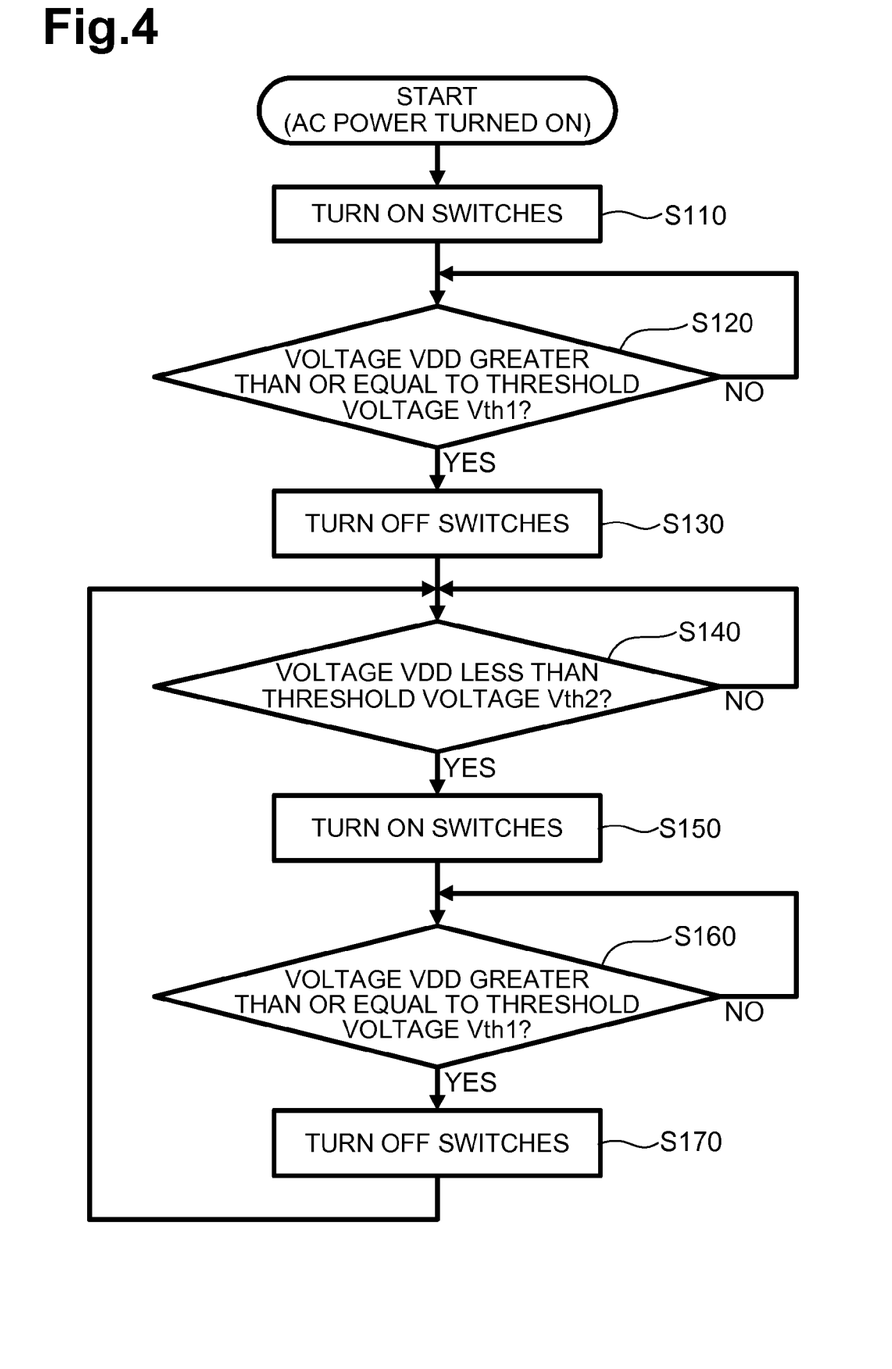
FIG. 4 is a flowchart illustrating current path switching processing according to an illustrative embodiment.
Figure 5:
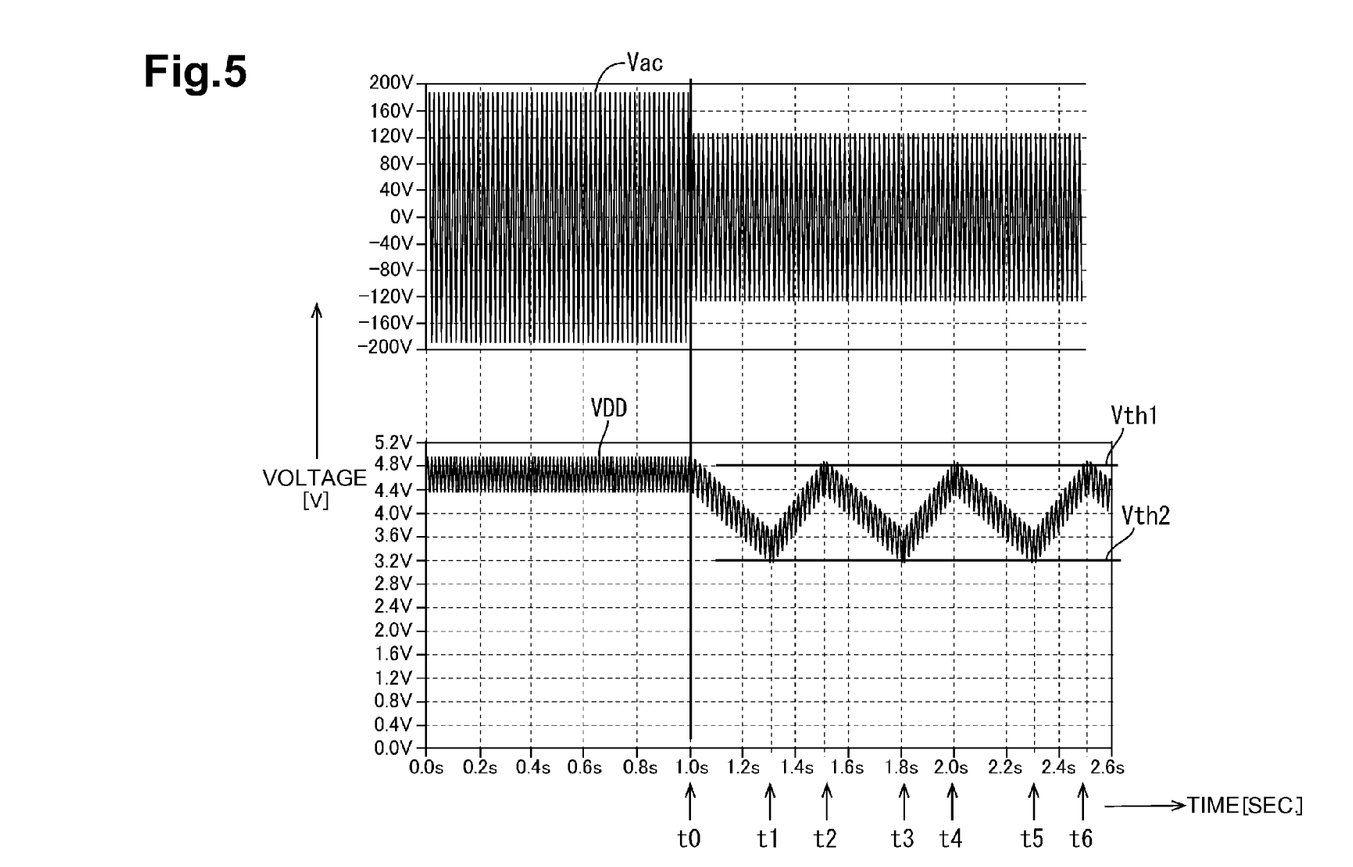
FIG. 5 is a graph illustrating relationship between an AC voltage and a smoothed voltage.

(2) In the above-described embodiment, the processes in steps S160 and S170 of FIG. 4 may be omitted. In this case also, reduction of the smoothed voltage VDD to less than the second threshold voltage Vth2 may be prevented or reduced when the AC voltage Vac is reduced from the predetermined voltage during the operation of the low-capacity power supply 30.

(3) In the above-described embodiment, the current path switching processing may be performed during the operation of the low-capacity power supply 30 when the AC voltage Vac is reduced from the predetermined voltage. However, the disclosure might not be limited thereto. The disclosure may be applied, for example, when the AC voltage Vac increases from a predetermined voltage during the operation of the low-capacity power supply 30. In this case, the first threshold voltage Vth1 may be set to a higher voltage, e.g., 6.0 V. Even when the AC voltage Vac is increased from the predetermined voltage, a leakage current from the low-capacity power supply 30 may be reduced or prevented and power saving may be achieved.

(4) In the above-described embodiment, the smoothed voltage VDD may be an example of an electricity-related amount corresponding to the voltage of the AC power supply AC. The detecting circuit may be constituted by the mode control circuit 70 and the A/D converter 71. However, the disclosure might not be limited thereto. In another embodiment, the AC voltage Vac itself may be an example of the electricity-related amount corresponding to the voltage of the AC power supply AC. The detecting circuit may be constructed as a circuit configured to detect the AC voltage Vac. Even in this case, reduction of the smoothed voltage VDD may be controlled by performing the current path switching processing according to changes in the AC voltage Vac, for example, in response to the reduction of the AC voltage Vac.

(5) In the above-described embodiment, the first input capacitor (e.g., the first capacitor group) may comprise the first capacitor C1 and the adjustment capacitor C3. The second input capacitor (e.g., the second capacitor group) may comprise the second capacitor C2 and the adjustment capacitor C4. The first switch SW1 may be provided in parallel with the adjustment capacitor C3. The second switch SW2 may be provided in parallel with the adjustment capacitor C4. The structure of the first input capacitor, the second input capacitor, and the switches SW1 and SW2 might not be limited thereto.

In other words, at least one adjustment capacitor may be provided that is configured to electrically connect to at least one of the first capacitor C1 and the second capacitor C2 in series and to adjust the capacitance of the at least one of the first capacitor C1 and the second capacitor C2. At least one switch SW may be provided that is configured to connect in parallel with any one of the first and second capacitors C1 and C2 and the at least one adjustment capacitor. The at least one switch SW may be configured to switch between a state in which the AC current from the AC power supply AC may flow therethrough and a state in which the AC current from the AC power supply AC may be prevented from flowing therethrough.

In this case, even when the AC voltage fluctuates from the predetermined voltage, the AC current may be adjusted by appropriately setting the capacitances of the first and second capacitors C1 and C2 and the at least one adjustment capacitor, and by switching the connection of the first and second capacitors C1 and C2 and the at least one adjustment capacitor to the AC power supply AC with the switching circuit, e.g., the switch SW. For example, when the AC voltage is reduced, the connection of the first capacitor C1, the second capacitor C2, and the at least one adjustment capacitor may be switched by the at least one switch SW to increase capacitance of the at least one of the first capacitor C1 and the second capacitor C2 with respect to the AC current. Thus, reduction in current capacity of the low-capacity power supply 30 may be reduced or prevented. Accordingly, the reduction of the smoothed voltage VDD may be controlled.

Figure 6:
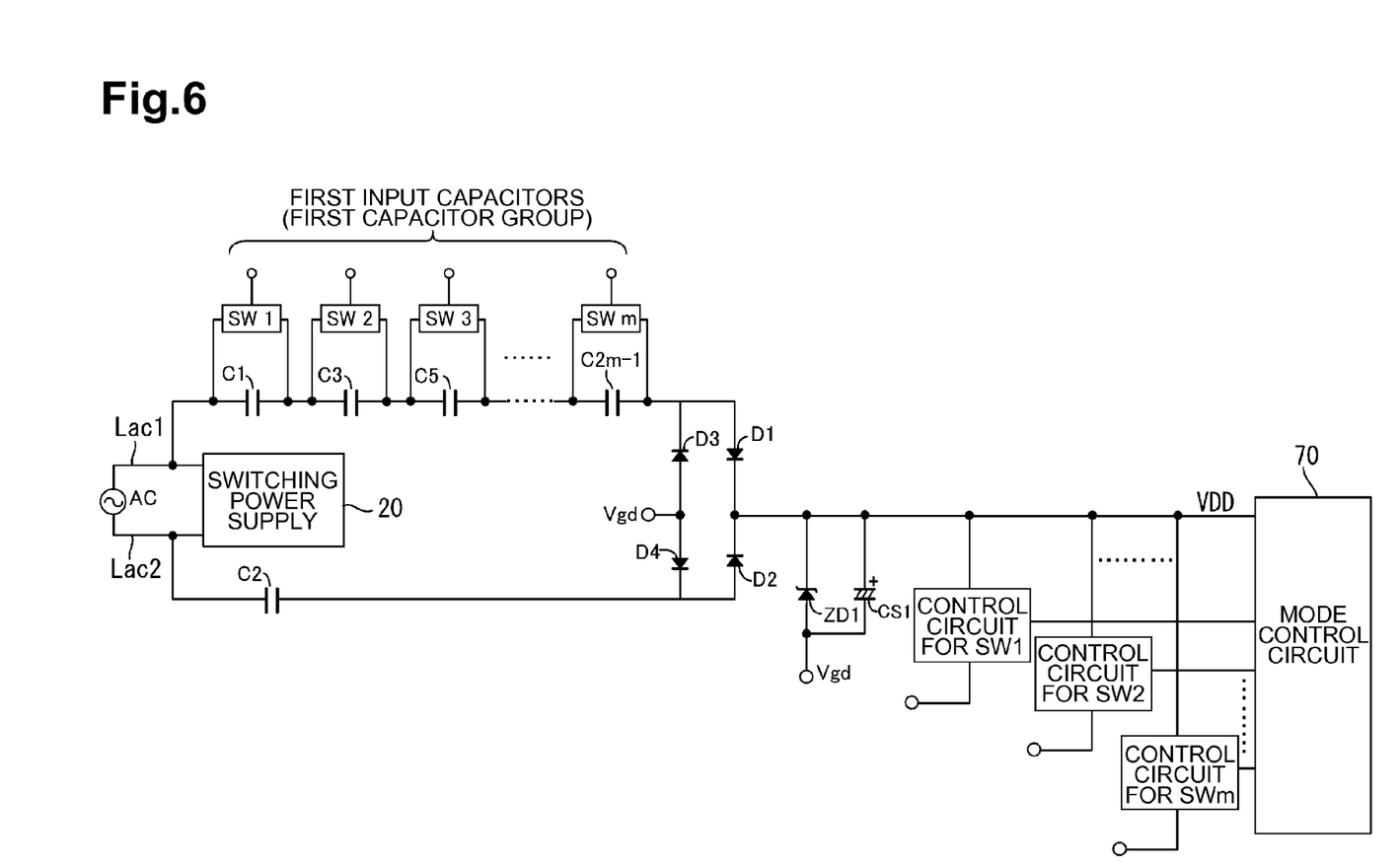
FIG. 6 is a circuit diagram illustrating configuration of a low-capacity power supply according to another illustrative embodiment.
Figure 7:
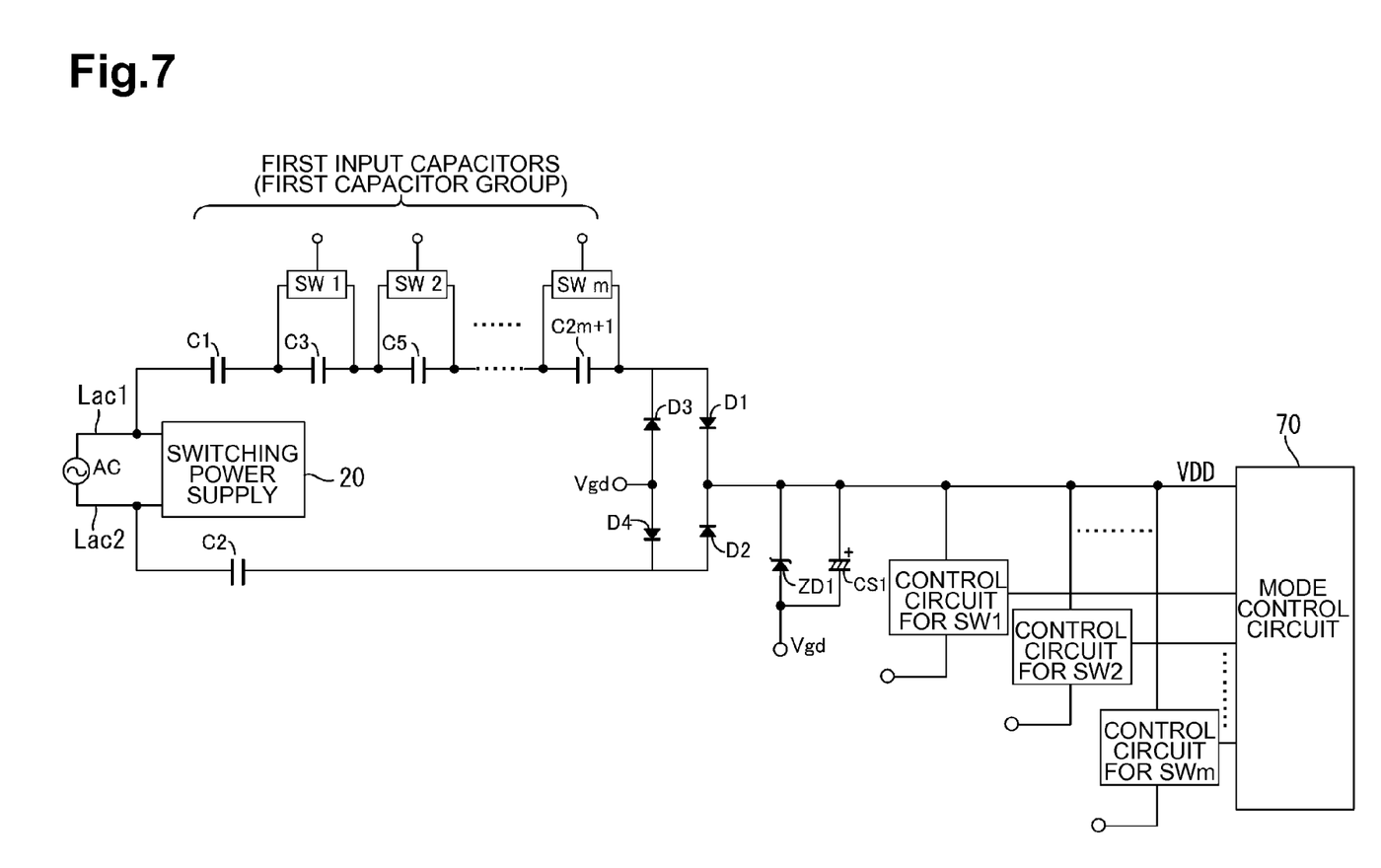
FIG. 7 is a circuit diagram illustrating configuration of a low-capacity power supply according to yet another illustrative embodiment.

(6) A plurality of the switches SW may be provided for a capacitor group. For example, as depicted in FIG. 6, the first input capacitor, e.g., the first capacitor group, may comprise the first capacitor C1 and at least one adjustment capacitor configured to electrically connect in series with the first capacitor C1 (C1, C3, . . . , C2m−1: "m" represents the number of two or more adjustment capacitors included in the first capacitor group wherein "m" takes at least one (1) and two (2)). A switching circuit, e.g., a switch SW (e.g., SW1, SW2, . . . SWm), may be provided for at least two capacitors included in the first capacitor group. In FIG. 7, the switch SW might not be provided for the first capacitor C1 (resulting with switches SW1, SW2, . . . SWm positioned across capacitors C3, C5, C2m+1, respectively).

The switch SW may be provided for at least two capacitors at either the AC line Lac1 or Lac2 (e.g., the AC line Lac1 in FIG. 6). The switch control circuit may be provided for each switch SW (e.g., SW1, SW2, . . . SWm). Thus, the capacitance of the first input capacitor or the second input capacitor may be adjusted minutely. Accordingly, when the printer 1 is connected to a frame ground and, the AC voltage Vac is half-wave rectified, the capacitance may be favorably adjusted. In other words, when the AC voltage Vac is half-wave rectified by the rectifier 31, the smoothed voltage VDD may be maintained within a predetermined range even when the AC voltage Vac fluctuates. At this time, the smoothed voltage VDD may be controlled with a desired accuracy by setting a plurality of the first threshold voltages Vth1 and a plurality of the second threshold voltage Vth2, each voltage Vth1 and Vth2 having a different voltage value.

When the switch SW is provided for the first capacitor C1, as depicted in FIG. 6, the first capacitor C1 may serve as an adjustment capacitor, so that the capacitance of the first input capacitor may be adjusted minutely. When the switch SW is not provided for the first capacitor C1, as depicted in FIG. 7, the capacitance of the first capacitor C1 may be set as a predetermined value and the maximum capacitance of the first capacitor group may be set to the predetermined value. Further, the number of the switches SW and the switch control circuits may be reduced.

Figure 8:
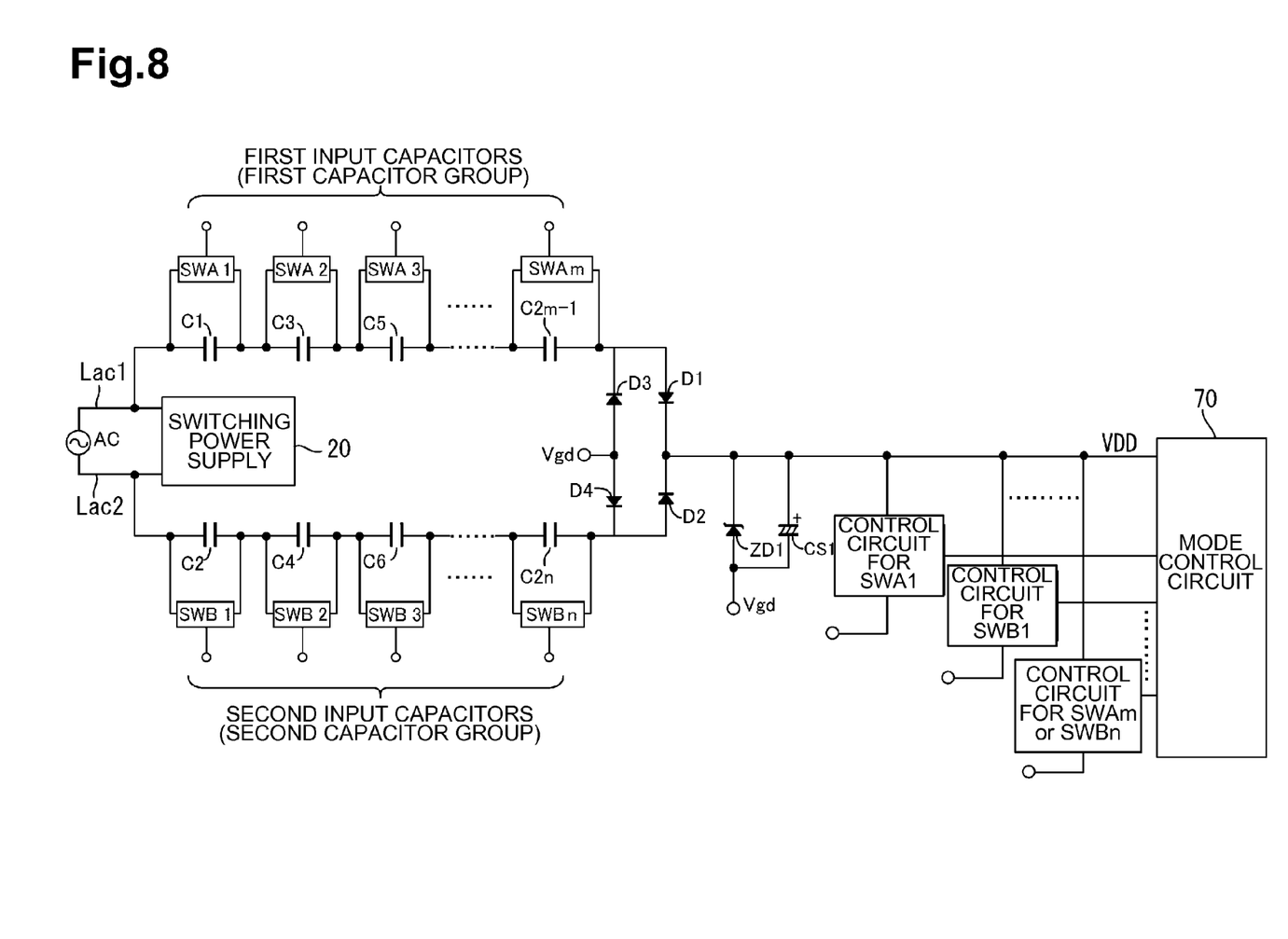
FIG. 8 is a circuit diagram illustrating configuration of a low-capacity power supply according to still another illustrative embodiment.
Figure 9:
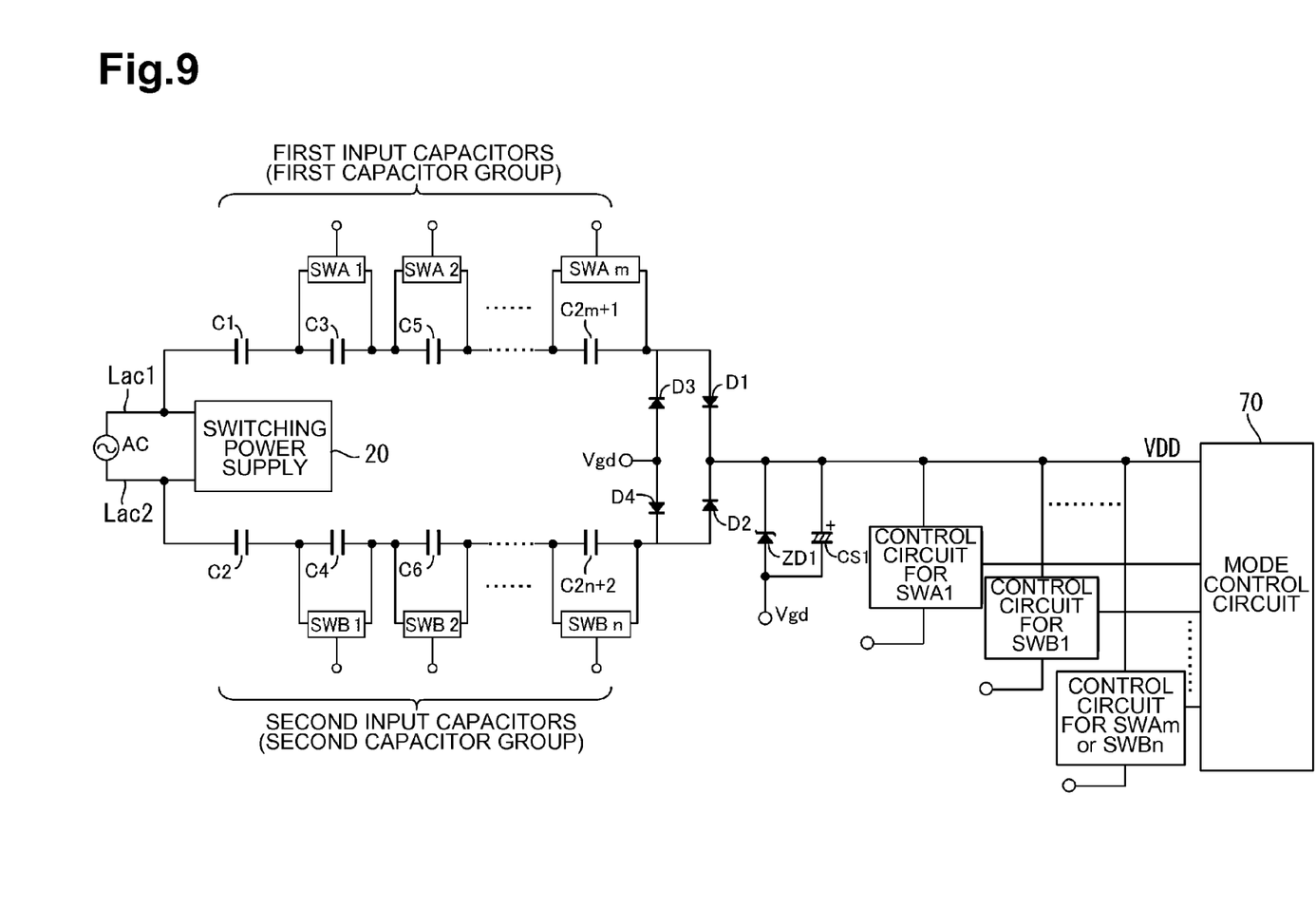
FIG. 9 is a circuit diagram illustrating configuration of a low-capacity power supply according to a further illustrative embodiment.

(7) At least one switch SW may be provided for each of a plurality of capacitor groups, e.g., the first capacitor group and the second capacitor group. As depicted in FIG. 8, the first capacitor group may comprise the first capacitor C1 and at least one adjustment capacitor configured to electrically connect to the first capacitor C1 in series (C1, C3, . . . C2m−1: "m" represents the number of two or more adjustment capacitors included in the first capacitor group wherein "m" takes at least one (1) and two (2)). The second capacitor group may comprise the second capacitor C2 and at least one adjustment capacitor configured to electrically connect to the second capacitor C2 in series (C2, C4, . . . C2n: "n" represents the number of two or more adjustment capacitors included in the second capacitor group wherein "n" takes at least one (1) and two (2)). The switching circuit, e.g., the switch SW, may be provided for at least one capacitor included in the first capacitor group and at least one capacitor included in the second capacitor group. In FIG. 8, the switch SW may be provided for the first and second capacitors C1 and C2 (SWA1 and SWB1, respectively, or, in other words, switches SWA1, SWA2, SWA3, and SWAm for capacitors C1, C3, C5, and C2m−1, respectively, and switches SWB1, SWB2, SWB3, and SWBn for capacitors C2, C4, C6, and C2n, respectively). In FIG. 9, the switch SW might not be provided for the first and second capacitors C1 and C2 (resulting with switches SWA1, SWA2, . . . SWAm positioned across capacitors C3, C5, C2m+1, respectively).

At least one adjustment capacitor may be provided for each of the first capacitor C1 and the second capacitor C2. The switch SW may be provided for at least one capacitor included in each of the first capacitor group and the second capacitor group (e.g., control circuit SWA1 for switch SWA1 and control circuit SWB1 for switch SWB1, respectively). Accordingly, the printer 1 is not connected to a frame ground (FG), e.g., the AC voltage Vac is full-wave rectified by the rectifier 31, the capacitances of the first and second input capacitors (e.g., the first and second capacitor groups) may be favorably adjusted. At this time, by appropriately setting the number of the adjustment capacitors and the switches SW and by providing the switch control circuit for each switch SW, the capacitance of the first and second input capacitors may be adjusted with a desired accuracy for the fluctuations of the AC voltage Vac. At this time, the smoothed voltage VDD may be controlled with a desired accuracy by setting a plurality of the first threshold voltages Vth1 and a plurality of the second threshold voltages Vth2, each voltage Vth1 and Vth2 having a different voltage value.

When the switch SW is provided for each of the first capacitor C1 and the second capacitor C2, as depicted in FIG. 8, the first and the second capacitors C1 and C2 may serve as the adjustment capacitors, so that the capacitance of the first input capacitor and the second input capacitor may be adjusted minutely.

(8) As depicted in FIG. 9, the switch SW may be provided for at least one adjustment capacitor included in the first capacitor group and at least one adjustment capacitor included in the second capacitor group, except the first capacitor C1 and the second capacitor C2.

In this case, the capacitance of the first capacitor C1 and the second capacitor C2 may be set as a predetermined value. The maximum capacitance of each capacitor group may be fixed to the predetermined value. Further, the number of the switches SW and the switch control circuits may be reduced.

(9) In the example of FIG. 8 or FIG. 9, the controller, e.g., the mode control circuit 70, may be configured to switch the at least one switching circuit, e.g., the at least one switch SW, included in either the first capacitor group or the second capacitor group when the fluctuation amount of the detected value, e.g., the smoothed voltage VDD, is smaller than a predetermined value. The mode control circuit 70 may be configured to switch the at least one switch SW included in each of the first capacitor group and the second capacitor group when the fluctuation amount of the smoothed voltage VDD is greater than or equal to the predetermined value.

In this case, when the low-capacity power supply 30 is not connected to a frame ground, the AC current may be changed in a half wave unit or on a half-wave basis, according to the fluctuation amount of the smoothed voltage VDD. Therefore, appropriate measures may be taken for fluctuations of the AC voltage Vac, e.g., fluctuations of the smoothed voltage VDD.

(10) The low-capacity power supply 30 may be applied to an image forming apparatus in the above-described illustrative embodiments. However, the disclosure might not be limited thereto. The low-capacity power supply 30 may be applied to other apparatuses having the normal mode and the power saving mode. The controller might not be limited to the mode control circuit 70.

While the disclosure has been described in detail referring to the specific embodiments thereof, this is merely an example, and various changes, arrangements and modifications may be applied therein without departing from the spirit and scope of the disclosure.

What is claimed is:

1. A low-capacity power supply connectable to an AC power supply having first and second terminals, the low-capacity power supply comprising:
   a first capacitor electrically connected to the first terminal of the AC power supply;
   a second capacitor electrically connected the second terminal of the AC power supply;
   at least one adjustment capacitor electrically connected to the first capacitor in series;
   at least one switching circuit electrically connected in parallel with any one of the first capacitor and the adjustment capacitor;
   a rectifier provided at a stage following the first capacitor with respect to the AC power supply;
   a smoothing circuit electrically connected to receive an output of the rectifier, the smoothing circuit configured to smooth the output of the rectifier;
   a detecting circuit configured to detect a voltage level of an output of the smoothing circuit; and
   a controller configured to control an operation of the switch circuit,
   wherein the rectifier is a full-wave rectifier with one input being downstream from the first capacitor and a second input being downstream from the second capacitor, and
   wherein the controller is configured to control the operation of the switch circuit in response to a detected voltage level from the detecting circuit.

2. The low-capacity power supply according to claim 1, wherein, when the detected value is less than a lower limit, the controller is configured to control the at least one switching circuit to switch the state thereof to allow the AC current to flow therethrough, thereby switching the current path in the switching processing.

3. The low-capacity power supply according to claim 1, wherein, when the detected value is greater than or equal to an upper limit, the controller is configured to control the at least one switching circuit to switch the state thereof to prevent the AC current from flowing therethrough, thereby switching the current path in the switching processing.

4. The low-capacity power supply according to claim 3, wherein the controller is configured to control the at least one switching circuit to switch the state thereof to allow the AC current to flow therethrough when power is started to be supplied from the AC power supply to the low-capacity power supply and configured to control the at least one switching circuit to switch the state thereof to prevent the AC current from flowing therethrough in the switching processing when the detected value becomes greater than or equal to the upper limit after power is started to be supplied from the AC power supply to the low-capacity power supply.

5. The low-capacity power supply according to claim 1,
wherein the first capacitor and the at least one the adjustment capacitor configured to electrically connect to the first capacitor in series constitute a capacitor group and a plurality of switching circuits is provided for the capacitor group.

6. The low-capacity power supply according to claim 1,
wherein the first capacitor and the at least one adjustment capacitor configured to electrically connect to the first capacitor in series constitute a first capacitor group,
wherein the second capacitor and a second adjustment capacitor of the at least one adjustment capacitor configured to electrically connect to the second capacitor in series constitute a second capacitor group, and
wherein the at least one switching circuit is provided for each of the first capacitor group and the second capacitor group.

7. The low-capacity power supply according to claim 6,
wherein the at least one switching circuit is provided for the at least one adjustment capacitor included in the first capacitor group and the at least one adjustment capacitor included in the second capacitor group.

8. The low-capacity power supply according to claim 6, further comprising:
a detecting circuit configured to detect a voltage level of an output of the smoothing circuit,
wherein the controller is configured to control the operation of the switch circuit in response to a detected voltage level from the detecting circuit, and
wherein the controller is configured to control the at least one switching circuit included in one of the first capacitor group and the second capacitor group to switch the state thereof when a fluctuation amount of the detected value is smaller than a predetermined value, and to control the at least one switching circuit included in each of the first capacitor group and the second capacitor group to switch the state thereof when the fluctuation amount of the detected value is greater than or equal to the predetermined value.

9. The low-capacity power supply according to claim 1,
wherein the smoothing circuit comprises a Zener diode and wherein the detecting circuit is configured to detect a Zener voltage of the Zener diode as the electricity-related amount.

10. The low-capacity power supply according to claim 1,
wherein the first capacitor and the at least one adjustment capacitor form a first capacitor group, and
wherein activation of the at least one switching circuit changes a capacitance of the first capacitor group.

11. The low-capacity power supply according to claim 1,
wherein the switching circuit is configured to alternatively allow an AC current from the AC power supply to flow therethrough and prevent the AC current from flowing therethrough.

12. The low-capacity power supply according to claim 1,
wherein the controller controls the operation of the switching circuit to permit an AC current to flow through the at least one switching circuit and not through the capacitor in which the switching circuit is arranged in parallel while the AC current flows through remaining capacitors.

13. The low-capacity power supply according to claim 1, further comprising:
a second switching circuit arranged in parallel with another capacitor of the first capacitor, the second capacitor, and the adjustment capacitor that is different from the capacitor arranged in parallel with the at least one switching circuit,
wherein the controller controls the operation of the switching circuit to permit an AC current to flow through the at least one switching circuit and not through the capacitor in which the switching circuit is arranged in parallel, and
wherein the controller controls the operation of the second switching circuit to permit the AC current to flow through the second switching circuit and not through the another capacitor.

14. An image forming apparatus comprising:
a power supply system comprising the low-capacity power supply according to claim 1 and a switching power supply; and
an image forming unit configured to form an image using a DC voltage supplied from the switching power supply,
wherein the controller is configured to perform mode switching processing in which switching is made between a normal mode in which the switching power supply is available and a power saving mode in which the switching power supply is not available.

* * * * *